US012676844B2

(12) United States Patent　　　　(10) Patent No.:　US 12,676,844 B2
Tucker et al.　　　　　　　　　　　　(45) Date of Patent:　　　Jul. 7, 2026

(54) METHODS AND SYSTEMS FOR PERFORMING DOMAIN-WIDE AUTHENTICATION AND AUTHORIZATION

(71) Applicant: Box, Inc., Redwood City, CA (US)

(72) Inventors: Christopher Tucker, South San Francisco, CA (US); Fernando Cerenza, San Francisco, CA (US); Kimberly Kung, San Bruno, CA (US); Prachi Jadhav, Emerald Hills, CA (US)

(73) Assignee: Box, Inc., Redwood City, CA (US)

( * ) Notice: Subject to any disclaimer, the term of this patent is extended or adjusted under 35 U.S.C. 154(b) by 475 days.

(21) Appl. No.: 18/171,948

(22) Filed: Feb. 21, 2023

(65) Prior Publication Data

US 2024/0154946 A1　　May 9, 2024

Related U.S. Application Data

(60) Provisional application No. 63/423,331, filed on Nov. 7, 2022.

(51) Int. Cl.
　H04L 67/1097　　(2022.01)
　H04L 9/40　　　　(2022.01)
　H04L 67/53　　　(2022.01)

(52) U.S. Cl.
　CPC ...... H04L 63/0807 (2013.01); H04L 67/1097 (2013.01); H04L 67/53 (2022.05)

(58) Field of Classification Search
　CPC ....... H04L 67/53; H04L 67/575; H04L 67/54;
　　　H04L 67/561; H04L 67/566; H04L 67/567; H04L 67/5662; H04L 67/63; H04L 63/0801; H04L 63/0838; H04L 63/0869;
(Continued)

(56) References Cited

U.S. PATENT DOCUMENTS 7,392,390 B2 *　6/2008　Newcombe ............. H04L 67/62
　　　　　　　　　　　　　　　　　　　　　713/168
9,781,210 B2 *　10/2017　Schoeffler ........... H04L 67/1097
9,813,403 B2 *　11/2017　Elien ...................... A63F 13/73
(Continued)

FOREIGN PATENT DOCUMENTS

CA　　　3101936 A1 *　2/2021　......... H04L 63/0861
CN　　101133421 A　*　2/2008　............. G06F 21/41
(Continued)

*Primary Examiner* — Khanh Q Dinh
(74) *Attorney, Agent, or Firm* — Sheridan Ross P.C.

(57)　　　　　ABSTRACT

According to one embodiment, a method for performing domain-wide authentication and authorization in a cloud-based environment can comprise receiving, from a third-party service of the cloud-based environment, a request to perform authentication and authorization of a user of the third-party service for accessing a cloud-based storage system of the cloud-based environment. A mapping of the user of the third-party service to a user account of the cloud-based storage system can be generated and one or more tokens for the user of the third-party service can in turn be generated based on the mapping of the user of the third-party service to the user account of the cloud-based storage system. The one or more tokens can provide access to services of the cloud-based storage system. The one or more tokens can be provided to the third-party service.

19 Claims, 7 Drawing Sheets

(58) Field of Classification Search
CPC ............. H04L 63/0892; H04L 63/0807; H04L
63/0884; H04L 67/1097
See application file for complete search history.

(56)                       References Cited

U.S. PATENT DOCUMENTS

| | | | | |
|---|---|---|---|---|
| 10,394,765 | B2 * | 8/2019 | Schoeffler ............. | G06F 16/182 |
| 10,819,709 | B1 * | 10/2020 | M'Raihi ............. | H04L 63/0807 |
| 11,240,309 | B1 * | 2/2022 | Varda ...................... | H04L 67/01 |
| 11,477,694 | B1 * | 10/2022 | Alasti ................... | H04L 47/215 |
| 11,483,738 | B1 * | 10/2022 | Alasti .............. | H04W 28/0942 |
| 11,582,641 | B1 * | 2/2023 | Alasti ................ | H04W 28/084 |
| 11,595,851 | B1 * | 2/2023 | Alasti .............. | H04W 28/0942 |
| 2007/0233828 | A1 * | 10/2007 | Gilbert ................. | G06F 16/907 |
| | | | | 707/E17.143 |
| 2011/0099616 | A1 * | 4/2011 | Mazur ................ | H04L 63/0846 |
| | | | | 726/7 |
| 2011/0265166 | A1 * | 10/2011 | Franco ................ | H04W 12/062 |
| | | | | 726/7 |
| 2014/0189839 | A1 * | 7/2014 | Jezek ................... | H04L 63/0815 |
| | | | | 726/8 |
| 2016/0294803 | A1 * | 10/2016 | Reddy ..................... | H04L 67/06 |
| 2018/0337975 | A1 * | 11/2018 | Kelly .................... | H04L 63/067 |
| 2019/0036933 | A1 * | 1/2019 | Pitchaimani ............ | H04L 67/53 |
| 2019/0036934 | A1 * | 1/2019 | Pitchaimani .......... | H04W 12/37 |
| 2020/0023548 | A1 * | 1/2020 | Abdolvand ........... | C22C 1/1031 |
| 2020/0023572 | A1 * | 1/2020 | Kito ......................... | C08L 75/06 |
| 2020/0042504 | A1 * | 2/2020 | Schoeffler .............. | H04L 63/08 |
| 2022/0382407 | A1 * | 12/2022 | Baker .................... | G06F 9/452 |
| 2023/0156522 | A1 * | 5/2023 | Bashir ................ | H04W 28/088 |
| | | | | 370/329 |

FOREIGN PATENT DOCUMENTS

| | | | | | |
|---|---|---|---|---|---|
| CN | 114172700 | A | * | 3/2022 | ......... H04L 63/0838 |
| TW | 200426599 | A | * | 12/2004 | ......... H04L 63/0807 |

* cited by examiner

300

Cloud-Based Storage System

Other Services
325

Authorization Service
330

305

DWAS

Mapping
340

Token Generation
345

Backfilling
350

335

Network
310

Third-Party Service

Auth.
320A

315A

Third-Party Service

Auth.
320B

315B

Third-Party Service

Auth.
320C

315C

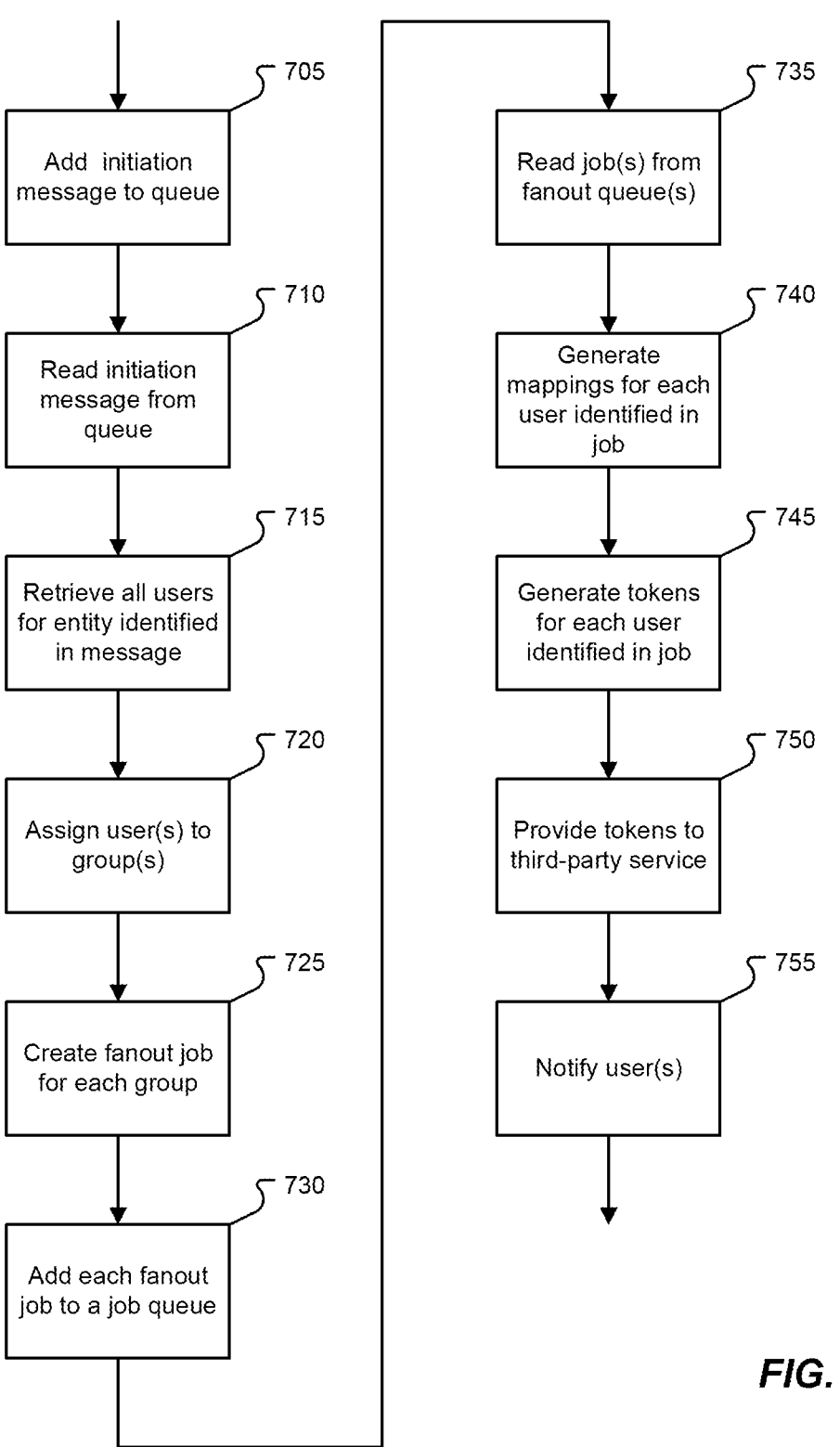

Add initiation message to queue — 705

Read initiation message from queue — 710

Retrieve all users for entity identified in message — 715

Assign user(s) to group(s) — 720

Create fanout job for each group — 725

Add each fanout job to a job queue — 730

Read job(s) from fanout queue(s) — 735

Generate mappings for each user identified in job — 740

Generate tokens for each user identified in job — 745

Provide tokens to third-party service — 750

Notify user(s) — 755

*FIG. 7*

METHODS AND SYSTEMS FOR PERFORMING DOMAIN-WIDE AUTHENTICATION AND AUTHORIZATION

CROSS REFERENCE TO RELATED APPLICATION

The present application claims the benefits of and priority, under 35 U.S.C. § 119(e), to U.S. Provisional Application No. 63/423,331 filed Nov. 7, 2022 by Tucker et al. and entitled "Methods and Systems for Performing Domain-Wide Authentication and Authorization" of which the entire disclosure is incorporated herein by reference for all purposes.

FIELD OF THE DISCLOSURE

Embodiments of the present disclosure relate generally to methods and systems for access controls in a cloud-based environment and more particularly to authenticating and authorizing users across a domain in a cloud-based environment.

BACKGROUND

A cloud-based storage system can provide access to remote storage as well as a number of services related to that storage including, but not limited to cloud-based backup of data, file sharing, a collaboration environment, etc. In some cases, additional, third-party services can operate in conjunction with the services provided by the cloud-based storage system to augment those services. For example, a third-party communications service may be used in a collaboration environment provided by the cloud-based storage system. In such cases, users of the third-party service log into that service but cannot access the services of the cloud-based storage system until they are also authenticated and authorized by that system. To do so, the users must then perform second login process for the cloud-based storage system. This additional, seemingly redundant step can be frustrating for users. Additionally, when a group of new users are added to the services provided by the cloud-based storage system, onboarding each of those users individually can be time consuming for administrators of the cloud-based storage system. Hence there is a need in the art for improved systems and methods for authenticating and authorizing users across a domain in a cloud-based environment

BRIEF SUMMARY

Embodiments of the disclosure provide systems and methods for authenticating and authorizing users across a domain in a cloud-based environment. According to one embodiment, a method for performing domain-wide authentication and authorization in a cloud-based environment can comprise receiving, from a third-party service of the cloud-based environment, a request to perform authentication and authorization of a user of the third-party service for accessing a cloud-based storage system of the cloud-based environment. A mapping of the user of the third-party service to a user account of the cloud-based storage system can be generated and one or more tokens for the user of the third-party service can in turn be generated based on the mapping of the user of the third-party service to the user account of the cloud-based storage system. The one or more tokens can provide access to services of the cloud-based storage system. The one or more tokens can be provided to the third-party service. In some cases, prior to generating the mapping of the user of the third-party service to the user account of the cloud-based storage system, a determination can be made as to whether the user of the third-party service is eligible for domain-wide authentication and authorization. In such cases, generating the mapping of the user of the third-party service to the user account of the cloud-based storage system, generating the one or more tokens for the user of the third-party service, and providing the one or more tokens to the third-party service can be performed in response to determining the user of the third-party service is eligible for domain-wide authentication and authorization.

Generating the mapping of the user of the third-party service to the user account of the cloud-based storage system can comprise receiving, from the third-party service, user information for the user of the third-party service, searching a set of user information of the cloud-based storage system based on the received user information for the user of the third-party service, and determining whether the user information for the user of the third-party service matches any user information in the set of user information of the cloud-based storage system. Mapping of the user of the third-party service to the user account of the cloud-based storage system can be performed in response to determining the user information for the user of the third-party service matches user information in the set of user information of the cloud-based storage system. In some cases, generating the mapping of the user of the third-party service to the user account of the cloud-based storage system can further comprise determining whether the user of the third-party service is eligible for domain-wide authentication and authorization. In such cases, mapping of the user of the third-party service to the user account of the cloud-based storage system can be performed in response to determining the user of the third-party service is eligible for domain-wide authentication and authorization. Additionally, or alternatively, generating the mapping of the user of the third-party service to the user account of the cloud-based storage system can comprise determining whether the user of the third-party service has opted out of domain-wide authentication and authorization, In such cases, mapping of the user of the third-party service to the user account of the cloud-based storage system can be performed in response to determining the user of the third-party service has not opted out of domain-wide authentication and authorization.

Generating the one or more tokens for the user of the third-party service based on the mapping of the user of the third-party service to the user account of the cloud-based storage system can comprise receiving, from the cloud-based storage system, information indicating a scope for authorization of the user of the third-party system and obtaining the one or more tokens for the user of the third-party service based on the information indicating the scope for authorization of the user of the third-party system. The one or more tokens for the user of the third-party service can then be provided to the third-party service and the user of the third-party service can be notified.

In some cases, a backfill process performing domain-wide authentication and authorization automatically for a set of users of the third-party service can be initiated. The backfill process can comprise adding an initiation message for the backfill process to a backfill queue. The initiation message can identify an entity for which the backfill process is performed. The user and the set of users can be associated with the entity. The backfill process can further comprise reading the initiation message for the backfill process from the backfill queue, retrieving user information for the set of users based on the entity identified in the initiation message, assigning the set of users to a group of users for the backfill process, creating a fanout job for the group of users, adding the fanout job to a job queue, reading the fanout job from the job queue, mapping the set of users of the third-party service to a set of users account of the cloud-based storage system, generating one or more tokens for the set of users of the third-party service based on the mapping of the set of users of the third-party service to the set of users account of the cloud-based storage system, providing the one or more tokens for the set of users of the third-party service to the third-party service, and notifying the set of users of the third-party service of authorization completion.

According to another embodiment, a system can comprise a processor and a memory coupled with and readable by the processor. The memory can store therein a set of instructions which, when executed by the processor, causes the processor to perform domain-wide authentication and authorization in a cloud-based environment by receiving, from a third-party service of the cloud-based environment, a request to perform authentication and authorization of a user of the third-party service for accessing a cloud-based storage system of the cloud-based environment, generating a mapping of the user of the third-party service to a user account of the cloud-based storage system, and generating one or more tokens for the user of the third-party service based on the mapping of the user of the third-party service to the user account of the cloud-based storage system. The one or more tokens can provide access to services of the cloud-based storage system. The instructions can further cause the processor to provide the one or more tokens to the third-party service.

Generating the mapping of the user of the third-party service to the user account of the cloud-based storage system can comprise receiving, from the third-party service, user information for the user of the third-party service, searching a set of user information of the cloud-based storage system based on the received user information for the user of the third-party service, and determining whether the user information for the user of the third-party service matches any user information in the set of user information of the cloud-based storage system. Mapping of the user of the third-party service to the user account of the cloud-based storage system can be performed in response to determining the user information for the user of the third-party service matches user information in the set of user information of the cloud-based storage system. In some cases, generating the mapping of the user of the third-party service to the user account of the cloud-based storage system can further comprise determining whether the user of the third-party service is eligible for domain-wide authentication and authorization. In such cases, mapping of the user of the third-party service to the user account of the cloud-based storage system can be performed in response to determining the user of the third-party service is eligible for domain-wide authentication and authorization. Additionally, or alternatively, generating the mapping of the user of the third-party service to the user account of the cloud-based storage system can comprise determining whether the user of the third-party service has opted out of domain-wide authentication and authorization, In such cases, mapping of the user of the third-party service to the user account of the cloud-based storage system can be performed in response to determining the user of the third-party service has not opted out of domain-wide authentication and authorization.

Generating the one or more tokens for the user of the third-party service based on the mapping of the user of the third-party service to the user account of the cloud-based storage system can comprise receiving, from the cloud-based storage system, information indicating a scope for authorization of the user of the third-party system and obtaining the one or more tokens for the user of the third-party service based on the information indicating the scope for authorization of the user of the third-party system. The one or more tokens for the user of the third-party service can then be provided to the third-party service and the user of the third-party service can be notified.

In some cases, the instructions can further cause the processor to initiate a backfill process performing domain-wide authentication and authorization automatically for a set of users of the third-party service. The backfill process can comprise adding an initiation message for the backfill process to a backfill queue. The initiation message can identify an entity for which the backfill process is performed. The user and the set of users can be associated with the entity. The backfill process can further comprise reading the initiation message for the backfill process from the backfill queue, retrieving user information for the set of users based on the entity identified in the initiation message, assigning the set of users to a group of users for the backfill process, creating a fanout job for the group of users, adding the fanout job to a job queue, reading the fanout job from the job queue, mapping the set of users of the third-party service to a set of users account of the cloud-based storage system, generating one or more tokens for the set of users of the third-party service based on the mapping of the set of users of the third-party service to the set of users account of the cloud-based storage system, providing the one or more tokens for the set of users of the third-party service to the third-party service, and notifying the set of users of the third-party service of authorization completion.

According to yet another embodiment, a non-transitory, computer-readable medium can comprise a set of instructions stored therein which, when executed by a processor, causes the processor to perform domain-wide authentication and authorization in a cloud-based environment by receiving, from a third-party service of the cloud-based environment, a request to perform authentication and authorization of a user of the third-party service for accessing a cloud-based storage system of the cloud-based environment, generating a mapping of the user of the third-party service to a user account of the cloud-based storage system, and generating one or more tokens for the user of the third-party service based on the mapping of the user of the third-party service to the user account of the cloud-based storage system. The one or more tokens can provide access to services of the cloud-based storage system. The instructions can further cause the processor to provide the one or more tokens to the third-party service.

Generating the mapping of the user of the third-party service to the user account of the cloud-based storage system can comprise receiving, from the third-party service, user information for the user of the third-party service, searching a set of user information of the cloud-based storage system based on the received user information for the user of the third-party service, and determining whether the user information for the user of the third-party service matches any user information in the set of user information of the cloud-based storage system. Mapping of the user of the third-party service to the user account of the cloud-based storage system can be performed in response to determining the user information for the user of the third-party service matches user information in the set of user information of the cloud-based storage system. In some cases, generating the mapping of the user of the third-party service to the user account of the cloud-based storage system can further comprise determining whether the user of the third-party service is eligible for domain-wide authentication and authorization. In such cases, mapping of the user of the third-party service to the user account of the cloud-based storage system can be performed in response to determining the user of the third-party service is eligible for domain-wide authentication and authorization. Additionally, or alternatively, generating the mapping of the user of the third-party service to the user account of the cloud-based storage system can comprise determining whether the user of the third-party service has opted out of domain-wide authentication and authorization, In such cases, mapping of the user of the third-party service to the user account of the cloud-based storage system can be performed in response to determining the user of the third-party service has not opted out of domain-wide authentication and authorization.

Generating the one or more tokens for the user of the third-party service based on the mapping of the user of the third-party service to the user account of the cloud-based storage system can comprise receiving, from the cloud-based storage system, information indicating a scope for authorization of the user of the third-party system and obtaining the one or more tokens for the user of the third-party service based on the information indicating the scope for authorization of the user of the third-party system. The one or more tokens for the user of the third-party service can then be provided to the third-party service and the user of the third-party service can be notified.

In some cases, the instructions can further cause the processor to initiate a backfill process performing domain-wide authentication and authorization automatically for a set of users of the third-party service. The backfill process can comprise adding an initiation message for the backfill process to a backfill queue. The initiation message can identify an entity for which the backfill process is performed. The user and the set of users can be associated with the entity. The backfill process can further comprise reading the initiation message for the backfill process from the backfill queue, retrieving user information for the set of users based on the entity identified in the initiation message, assigning the set of users to a group of users for the backfill process, creating a fanout job for the group of users, adding the fanout job to a job queue, reading the fanout job from the job queue, mapping the set of users of the third-party service to a set of users account of the cloud-based storage system, generating one or more tokens for the set of users of the third-party service based on the mapping of the set of users of the third-party service to the set of users account of the cloud-based storage system, providing the one or more tokens for the set of users of the third-party service to the third-party service, and notifying the set of users of the third-party service of authorization completion.

BRIEF DESCRIPTION OF THE DRAWINGS

FIG. 7 is a flowchart illustrating an exemplary process for performing backfilling according to one embodiment of the present disclosure.

Figure 1:
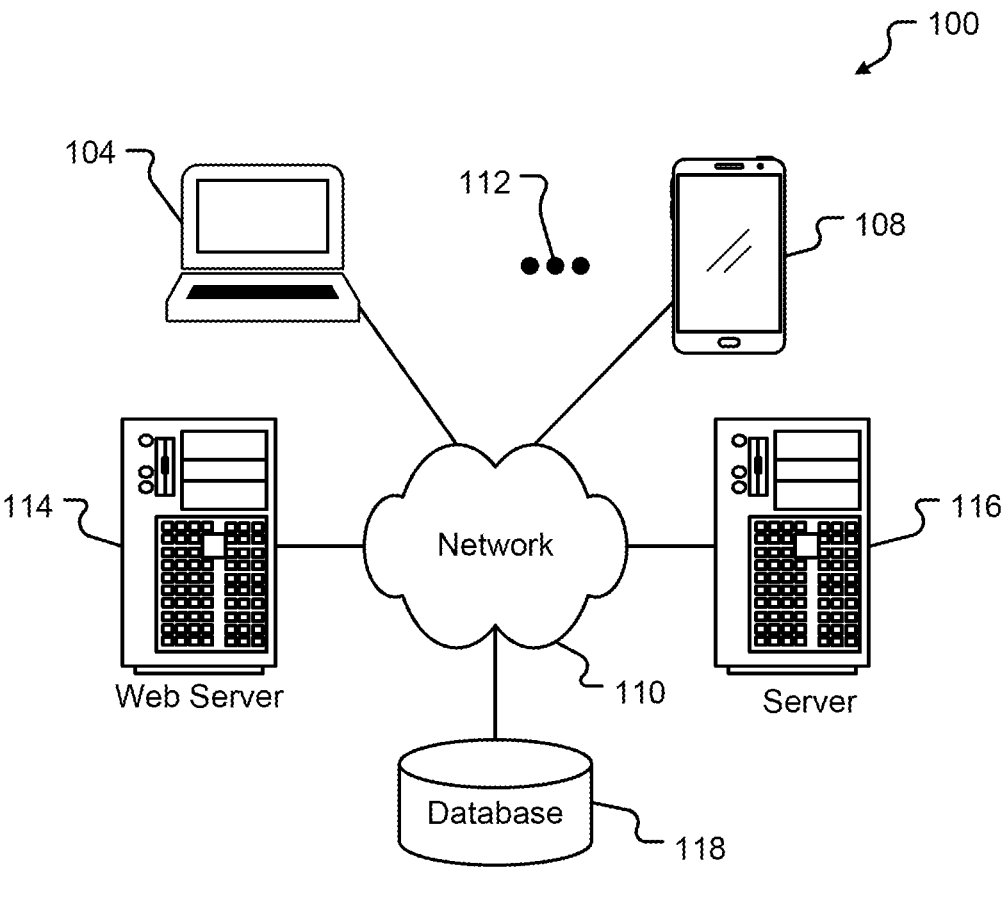
FIG. 1 is a block diagram illustrating elements of an exemplary computing environment in which embodiments of the present disclosure may be implemented.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a Local-Area Network (LAN) and/or Wide-Area Network (WAN) such as the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C" "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, Non-Volatile Random-Access Memory (NVRAM), or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a Compact Disk Read-Only Memory (CD-ROM), any other optical medium, punch cards, paper tape, any other physical medium with patterns of holes, a Random-Access Memory (RAM), a Programmable Read-Only Memory (PROM), and Erasable Programmable Read-Only Memory (EPROM), a Flash-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, Radio Frequency (RF), etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as Programmable Logic Device (PLD), Programmable Logic Array (PLA), Field Programmable Gate Array (FPGA), Programmable Array Logic (PAL), special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments®

Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or Very Large-Scale Integration (VLSI) design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or Common Gateway Interface (CGI) script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

FIG. 1 is a block diagram illustrating elements of an exemplary computing environment in which embodiments of the present disclosure may be implemented. More specifically, this example illustrates a computing environment 100 that may function as the servers, user computers, or other systems provided and described herein. The environment 100 includes one or more user computers, or computing devices, such as a computing device 104, a communication device 108, and/or more 112. The computing devices 104, 108, 112 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 104, 108, 112 may also have any of a variety of applications, including for example, database client and/or server applications, and web browser applications. Alternatively, the computing devices 104, 108, 112 may be any other electronic device, such as a thin-client computer, Internet-enabled mobile telephone, and/or personal digital assistant, capable of communicating via a network 110 and/or displaying and navigating web pages or other types of electronic documents. Although the exemplary computer environment 100 is shown with two computing devices, any number of user computers or computing devices may be supported.

Environment 100 further includes a network 110. The network 110 may can be any type of network familiar to those skilled in the art that can support data communications using any of a variety of commercially-available protocols, including without limitation Session Initiation Protocol (SIP), Transmission Control Protocol/Internet Protocol (TCP/IP), Systems Network Architecture (SNA), Internetwork Packet Exchange (IPX), AppleTalk, and the like. Merely by way of example, the network 110 maybe a Local Area Network (LAN), such as an Ethernet network, a Token-Ring network and/or the like; a wide-area network; a virtual network, including without limitation a Virtual Private Network (VPN); the Internet; an intranet; an extranet; a Public Switched Telephone Network (PSTN); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 114, 116. In this example, server 114 is shown as a web server and server 116 is shown as an application server. The web server 114, which may be used to process requests for web pages or other electronic documents from computing devices 104, 108, 112. The web server 114 can be running an operating system including any of those discussed above, as well as any commercially-available server operating systems. The web server 114 can also run a variety of server applications, including SIP servers, HyperText Transfer Protocol (secure) (HTTP(s)) servers, FTP servers, CGI servers, database servers, Java servers, and the like. In some instances, the web server 114 may publish operations available operations as one or more web services.

The environment 100 may also include one or more file and or/application servers 116, which can, in addition to an operating system, include one or more applications accessible by a client running on one or more of the computing devices 104, 108, 112. The server(s) 116 and/or 114 may be one or more general purpose computers capable of executing programs or scripts in response to the computing devices 104, 108, 112. As one example, the server 116, 114 may execute one or more web applications. The web application may be implemented as one or more scripts or programs written in any programming language, such as Java™, C, C#®, or C++, and/or any scripting language, such as Perl, Python, or Tool Command Language (TCL), as well as combinations of any programming/scripting languages. The application server(s) 116 may also include database servers, including without limitation those commercially available from Oracle®, Microsoft®, Sybase®, IBM® and the like, which can process requests from database clients running on a computing device 104, 108, 112.

The web pages created by the server 114 and/or 116 may be forwarded to a computing device 104, 108, 112 via a web (file) server 114, 116. Similarly, the web server 114 may be able to receive web page requests, web services invocations, and/or input data from a computing device 104, 108, 112 (e.g., a user computer, etc.) and can forward the web page requests and/or input data to the web (application) server 116. In further embodiments, the server 116 may function as a file server. Although for ease of description, FIG. 1 illustrates a separate web server 114 and file/application server 116, those skilled in the art will recognize that the functions described with respect to servers 114, 116 may be performed by a single server and/or a plurality of specialized servers, depending on implementation-specific needs and parameters. The computer systems 104, 108, 112, web (file) server 114 and/or web (application) server 116 may function as the system, devices, or components described herein.

The environment 100 may also include a database 118. The database 118 may reside in a variety of locations. By way of example, database 118 may reside on a storage medium local to (and/or resident in) one or more of the computers 104, 108, 112, 114, 116. Alternatively, it may be remote from any or all of the computers 104, 108, 112, 114, 116, and in communication (e.g., via the network 110) with one or more of these. The database 118 may reside in a Storage-Area Network (SAN) familiar to those skilled in the art. Similarly, any necessary files for performing the functions attributed to the computers 104, 108, 112, 114, 116 may be stored locally on the respective computer and/or remotely, as appropriate. The database 118 may be a relational database, such as Oracle 20i®, that is adapted to store, update, and retrieve data in response to Structured Query Language (SQL) formatted commands.

Figure 2:
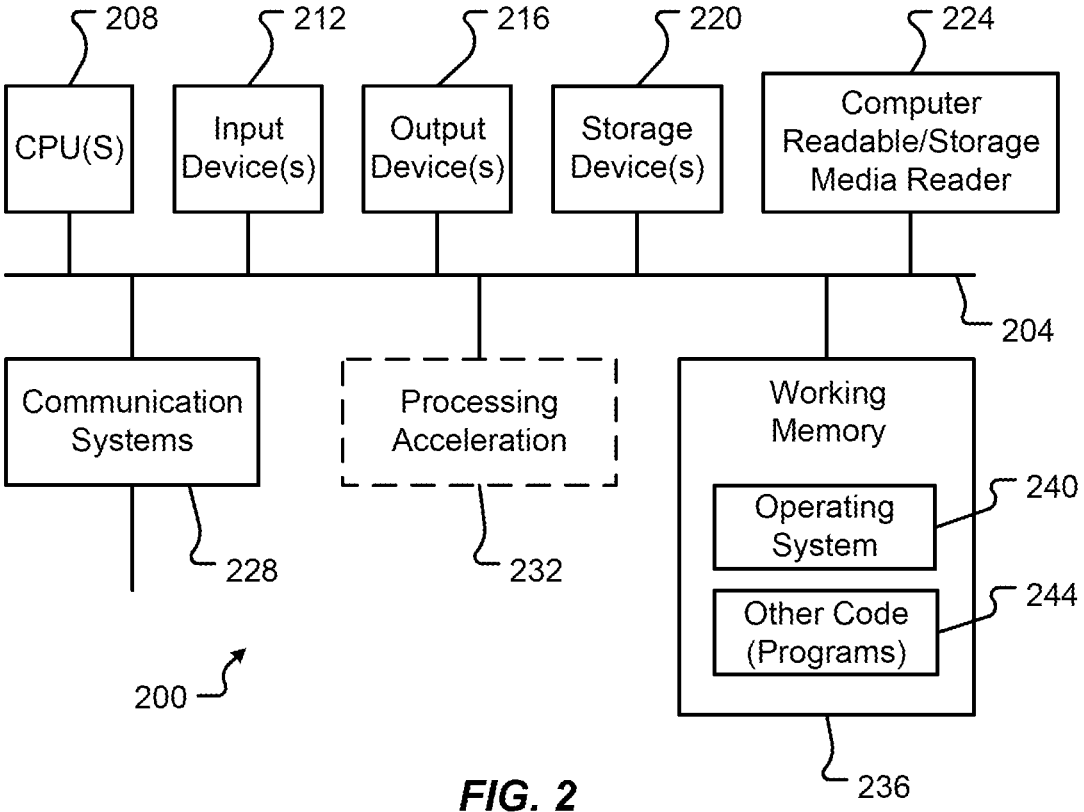
FIG. 2 is a block diagram illustrating elements of an exemplary computing device in which embodiments of the present disclosure may be implemented.

FIG. 2 is a block diagram illustrating elements of an exemplary computing device in which embodiments of the present disclosure may be implemented. More specifically, this example illustrates one embodiment of a computer system 200 upon which the servers, user computers, computing devices, or other systems or components described above may be deployed or executed. The computer system 200 is shown comprising hardware elements that may be electrically coupled via a bus 204. The hardware elements may include one or more Central Processing Units (CPUs) 208; one or more input devices 212 (e.g., a mouse, a keyboard, etc.); and one or more output devices 216 (e.g., a display device, a printer, etc.). The computer system 200 may also include one or more storage devices 220. By way of example, storage device(s) 220 may be disk drives, optical storage devices, solid-state storage devices such as a Random-Access Memory (RAM) and/or a Read-Only Memory (ROM), which can be programmable, flash-updateable and/or the like.

The computer system 200 may additionally include a computer-readable storage media reader 224; a communications system 228 (e.g., a modem, a network card (wireless or wired), an infra-red communication device, etc.); and working memory 236, which may include RAM and ROM devices as described above. The computer system 200 may also include a processing acceleration unit 232, which can include a Digital Signal Processor (DSP), a special-purpose processor, and/or the like.

The computer-readable storage media reader 224 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 228 may permit data to be exchanged with a network and/or any other computer described above with respect to the computer environments described herein. Moreover, as disclosed herein, the term "storage medium" may represent one or more devices for storing data, including ROM, RAM, magnetic RAM, core memory, magnetic disk storage mediums, optical storage mediums, flash memory devices and/or other machine-readable mediums for storing information.

The computer system 200 may also comprise software elements, shown as being currently located within a working memory 236, including an operating system 240 and/or other code 244. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 208 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 3:
FIG. 3 is a block diagram illustrating elements of an exemplary environment in which domain-wide authentication and authorization may be implemented according to one embodiment of the present disclosure.

FIG. 3 is a block diagram illustrating elements of an exemplary environment in which domain-wide authentication and authorization may be implemented according to one embodiment of the present disclosure. As illustrated in this example, a cloud-based environment 300 can comprise a cloud-based storage system 305. The cloud-based storage system can be implemented on any one or more servers and/or other computing devices as described above. The cloud-based storage system 305 can be communicatively coupled with any one or more wired and/or wireless communications networks 310 also as described above. One or more third-party services 315A-315C can also be communicatively coupled with the communications network 310.

Generally speaking, users of the third-party services 315A-315C can access those services by logging in through an authentication and authorization process 320A-320C provided by each of the services 315A-315C. Additionally, the users of the third-party services 315A-315C can access services 325 of the cloud-based storage system 305. Typically, the users would have an account with the cloud-based storage system 305 and, after logging into a third-party service 315A, would then log into the cloud-based storage system 305 through a login process provided by an authorization service 330 of the cloud-based storage system 305.

According to one embodiment, the cloud-based environment 300 can further include a domain-wide authentication and authorization service 335 implemented on any one or more servers and/or other computing devices as described above. Generally speaking, the domain-wide authentication and authorization service 335 can perform authentication and authorization for accessing the services 325 of the cloud-based storage system 305 to users of the third-party services 315A-315C. More specifically, the domain-wide authentication and authorization service 335 perform domain-wide authentication and authorization in a cloud-based environment 300 by receiving, from a third-party service 315A, a request to perform authentication and authorization of a user of the third-party service 315A. The domain-wide authentication and authorization service 335 can execute a mapping process that can expose an Application Program Interface (API) (not shown here) to the third-party service 315A through which information identifying the user can be submitted. The mapping process 340 can use that information to identify the user of the third-party service 315A and map that user to a user account of the cloud-based storage system 305.

The domain-wide authentication and authorization service 335 can also execute a token generation process 345 that can obtain one or more tokens for the user of the third-party service 315A. For example, based on the mapping of the user to the user account of the cloud-based storage system 305, the token generation process can request tokens from the authorization services 330 of the cloud-based storage system 305. The tokens can be used by the third-party service 315A to provide access to services 325 of the cloud-based storage system 305. The token generation process can provide the tokens to the third-party service 315A and notify the user that they have been granted access to the services 325 of the cloud-based storage system 305, i.e., that authorization has been completed.

The domain-wide authentication and authorization service 335 can also execute a backfilling process. Generally speaking, the backfilling process 350 can perform domain-wide authentication and authorization for a group of users of a third-party service 315A. For example, the backfilling process 350 can onboard a group of users of a third-party service 315A to domain-wide authentication and authorization when an administrator of the third-party service 315A and/or the cloud-based storage system 305 first enables domain-wide authentication and authorization for those users. In another example, when a new group of users are added to or provisioned for a third-party service 315A, those users can be onboarded by the backfilling process 350 utilizing the mapping process 340 and token generation process 345 in a way similar to described above. Additional details of processes as may be performed by the domain-wide authentication and authorization service 335 will be described below with reference to FIGS. 4-7.

Figure 4:
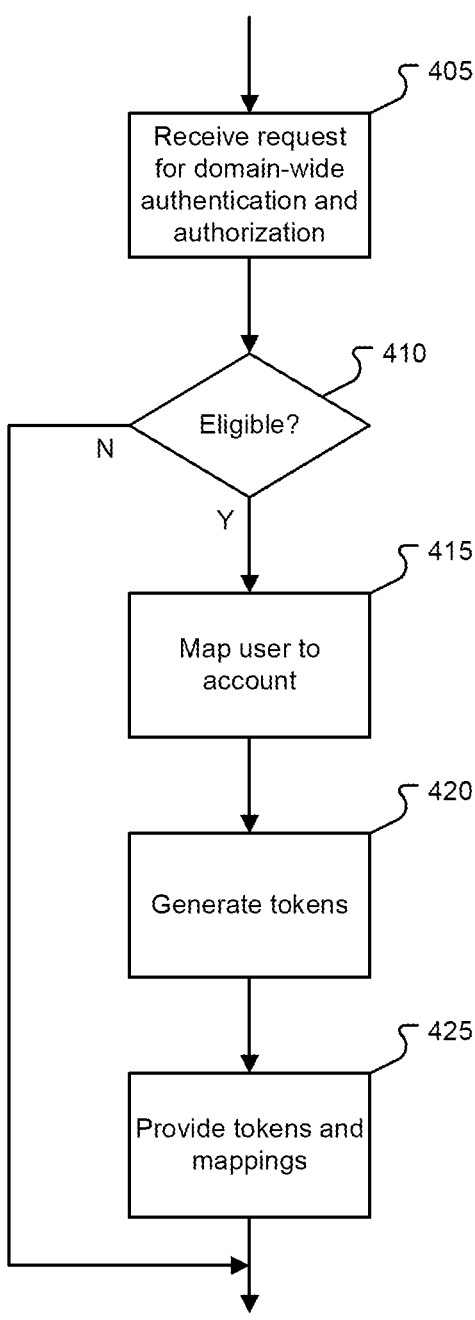
FIG. 4 is a flowchart illustrating an exemplary process for performing domain-wide authentication and authorization according to one embodiment of the present disclosure.

FIG. 4 is a flowchart illustrating an exemplary process for performing domain-wide authentication and authorization according to one embodiment of the present disclosure. As illustrated in this example, performing domain-wide authentication and authorization in a cloud-based environment 300 such as described above can comprise receiving 405, from a third-party service 315A of the cloud-based environment 300, a request to perform authentication and authorization of a user of the third-party service 315A for accessing a cloud-based storage system 305 of the cloud-based environment 300. A determination 410 can be made as to whether the user of the third-party service 315A is eligible for domain-wide authentication and authorization. This determination 410 can be based on whether the third-party service 315A is eligible for domain-wide authentication and authorization and/or whether domain-wide authentication and authorization is enabled in the cloud based storage system 305 for the third-party service 315A. Additionally, or alternatively, this determination 410 can be based on a user profile for the user, an entity which the user is associated with, the service through which the request is made, etc.

In response to determining 410 the user of the third-party service 315A is eligible for domain-wide authentication and authorization, the user of the third-party service 315A can be mapped 415 to a user account of the cloud-based storage system 305 and one or more tokens for the user of the third-party service 315A can be generated 420 based on the mapping of the user of the third-party service 315A to the user account of the cloud-based storage system 305. Additional details of an exemplary process for mapping 415 the user to the user account of the cloud-based storage system 305 will be described below with reference to FIG. 5. Additional details of an exemplary process for generating 420 tokens will be described below with reference to FIG. 6. The one or more tokens can provide access to services of the cloud-based storage system 305 and services 325 thereof. The one or more tokens can then be provided 425 to the third-party service 315A and used by the third-party service 315A when the user accesses services 325 of the cloud-based storage system 305.

Figure 5:
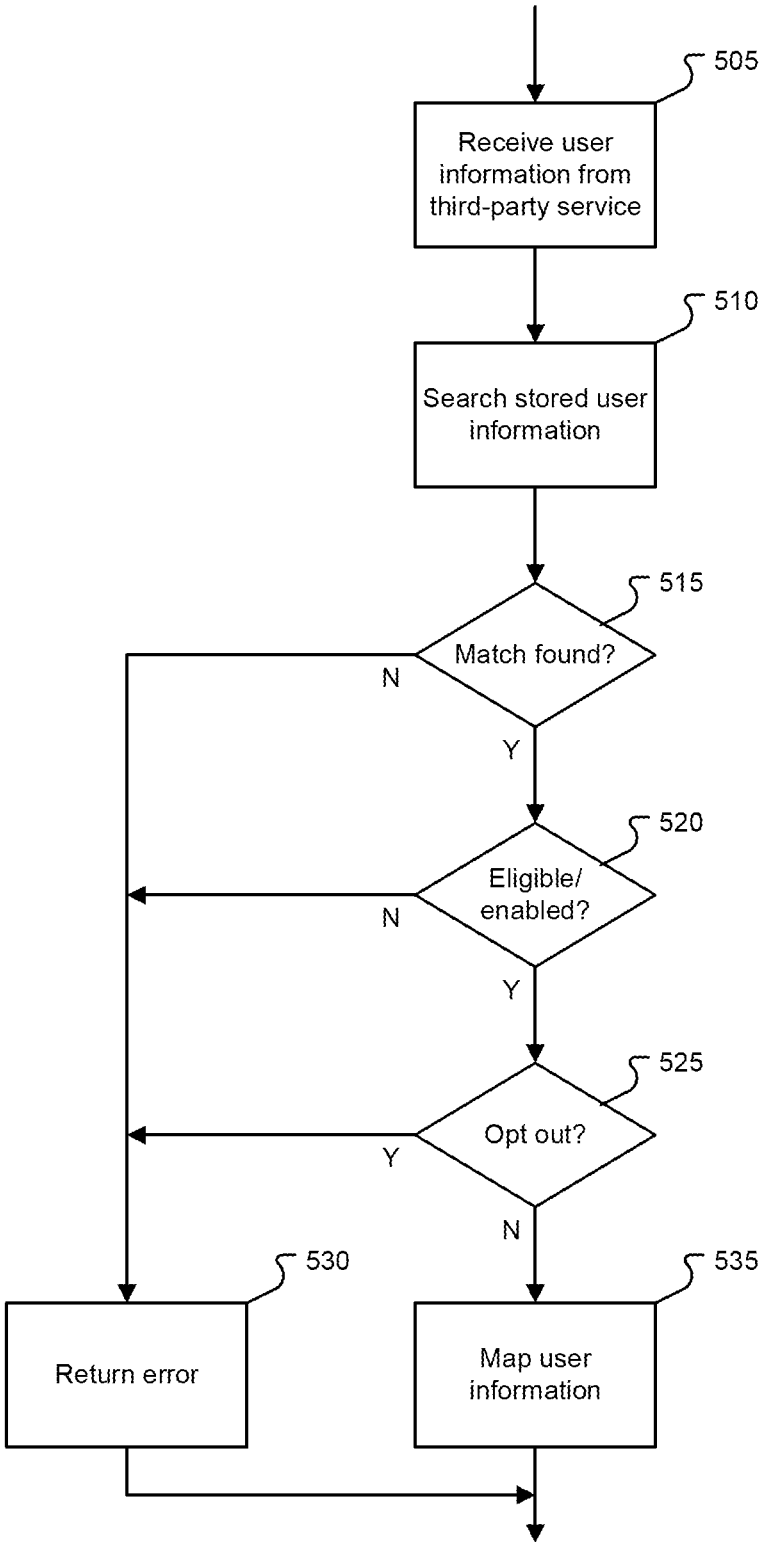
FIG. 5 is a flowchart illustrating an exemplary process for performing user mapping according to one embodiment of the present disclosure.

FIG. 5 is a flowchart illustrating an exemplary process for performing user mapping according to one embodiment of the present disclosure. As illustrated in this example, generating the mapping of the user of the third-party service to the user account of the cloud-based storage system can comprise receiving 505, from the third-party service 315A, user information for the user of the third-party service 315A and searching 510 a set of user information of the cloud-based storage system 305 based on the received user information for the user of the third-party service 315A. A determination 515 can be made as to whether the user information for the user of the third-party service 315A matches any user information in the set of user information of the cloud-based storage system 305, i.e., whether the user has a user account with the cloud-based storage system 305. For example, this information can include, but is not limited to, an email address for the user, a user IDentifier (ID), Personal Identifiable Information (PII), a Single Sign-On (SSO) integration, etc.

In some cases, in response to determining 515 the user information for the user of the third-party service 315A matches user information in the set of user information of the cloud-based storage system 305 one or more other determinations can be made. For example, a determination 520 can be made as to whether the user of the third-party service 315A, e.g., based on the user, an entity the user is associated with, etc., is eligible for domain-wide authentication and authorization. Additionally, or alternatively, a determination 525 can be made as to whether the user of the third-party service has opted out of domain-wide authentication and authorization, e.g., based on a user profile for the user.

In response to any of determining 515 the user information for the user of the third-party service 315A does not match user information in the set of user information of the cloud-based storage system 305, determining 520 the user is not eligible for domain-wide authentication and authorization, or determining 525 that the user has opted out of domain-wide authentication and authorization, an error message can be returned 530 to the third-party service 315A. In response to determining 515 the user information for the user of the third-party service matches user information in the set of user information of the cloud-based storage system and, in some cases, determining 520 the user is eligible for domain-wide authentication and authorization, or determining 525 that the user has not opted out of domain-wide authentication and authorization, mapping 535 of the user of the third-party service to the user account of the cloud-based storage system can be performed.

Figure 6:
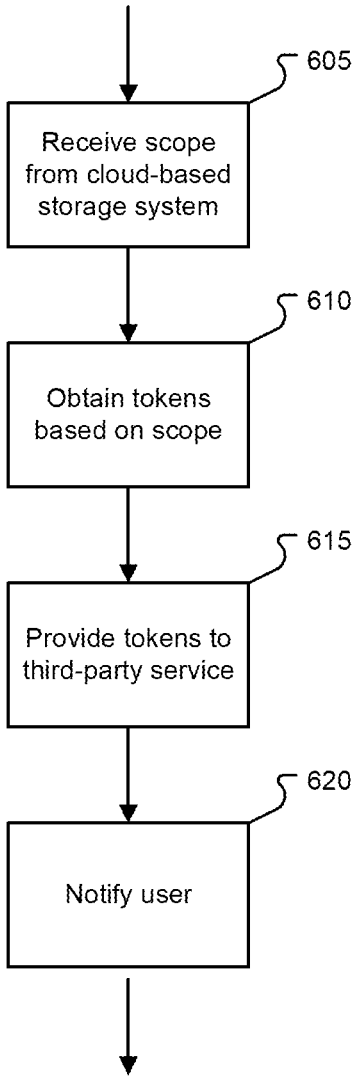
FIG. 6 is a flowchart illustrating an exemplary process for performing token generation according to one embodiment of the present disclosure.

FIG. 6 is a flowchart illustrating an exemplary process for performing token generation according to one embodiment of the present disclosure. As illustrated in this example, generating the one or more tokens for the user of the third-party service 315A based on the mapping of the user of the third-party service 315A to the user account of the cloud-based storage system 305 can comprise receiving 605, from the cloud-based storage system 305, information indicating a scope for authorization of the user of the third-party system and obtaining 610 the one or more tokens for the user of the third-party service 315A from the cloud-based storage system 305 based on the information indicating the scope for authorization of the user of the third-party system 315A. The one or more tokens for the user of the third-party service 315A can then be provided 615 to the third-party service 315A and the user of the third-party service 315A can be notified 620 of authorization completion.

FIG. 7 is a flowchart illustrating an exemplary process for performing backfilling according to one embodiment of the present disclosure. As noted above, a backfill process performing domain-wide authentication and authorization automatically for a group of one or more users of the third-party service 315A. This backfilling process can be initiated periodically, on demand, or automatically in response to the occurrence of some event such as when an administrator of the third-party service 315A and/or the cloud-based storage system 305 first enables domain-wide authentication and authorization for those users, when a new group of users are added to or provisioned for a third-party service 315A, etc. These users may be associated or affiliated with an entity, e.g., same company, group, educational or other institution, etc.

As illustrated in this example, the backfill process can comprise adding 705 an initiation message for the backfill process to a backfill queue. The initiation message can identify the entity for which the backfill process is performed. At a later point in time, the initiation message for the backfill process can be read 710 from the backfill queue, user information for a set of one or more users can be retrieved 715 based on the entity identified in the initiation message, the set of users can be assigned 720 to a group, i.e., sub-group, of users for the backfill process, a fanout job can be created 725 for the group of users, and the fanout job can be added 730 to a job queue.

At a later point in time, the fanout job can be read 735 from the job queue and each user of the third-party service 315A can be mapped 740 to a user account of the cloud-based storage system such as described above with reference to FIG. 5. One or more tokens for the user of the third-party service 315A can be generated 745 based on the mapping of the user of the set of users of the third-party service 315A to the user account of the cloud-based storage system and as described above with reference to FIG. 6. The one or more tokens for the user of the set of users of the third-party service 315A can be provided 750 to the third-party service 315A and the user of the third-party service 315A can be notified 755 of authorization completion.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for performing domain-wide authentication and authorization in a cloud-based environment, the method comprising:

initiating, by a domain-wide authorization system, a backfill process performing domain-wide authentication and authorization for a plurality of users of a third-party service of the cloud-based environment, wherein the backfill process comprises onboarding of the plurality of users of the third-party service as users of the cloud-based environment;

receiving, by the domain-wide authorization system, from the third-party service of the cloud-based environment, a request to perform authentication and authorization of a user of the of the plurality of users of the third-party service for accessing a cloud-based storage system of the cloud-based environment through the third-party service, wherein the user of the third party service is logged into the third-party service but not the cloud-based storage system;

generating, by the domain-wide authorization system, a mapping of the user of the third-party service to a user account of the user of the third-party service on the cloud-based storage system;

generating, by the domain-wide authorization system, one or more tokens for the user of the third-party service based on the mapping of the user of the third-party service to the user account of the cloud-based storage system, wherein the one or more tokens provide access to services of the cloud-based storage system; and providing, by the domain-wide authorization system, the one or more tokens to the third-party service.

2. The method of claim 1, further comprising, prior to generating the mapping of the user of the third-party service to the user account of the cloud-based storage system, determining, by the domain-wide authorization system, whether the user of the third-party service is eligible for domain-wide authentication and authorization and wherein generating the mapping of the user of the third-party service to the user account of the cloud-based storage system, generating the one or more tokens for the user of the third-party service, and providing the one or more tokens to the third-party service are performed in response to determining the user of the third-party service is eligible for domain-wide authentication and authorization.

3. The method of claim 1, wherein generating the mapping of the user of the third-party service to the user account of the cloud-based storage system comprises:

receiving, by the domain-wide authorization system, from the third-party service, user information for the user of the third-party service;

searching, by the domain-wide authorization system, a set of user information of the cloud-based storage system based on the received user information for the user of the third-party service; and determining, by the domain-wide authorization service, whether the user information for the user of the third-party service matches any user information in the set of user information of the cloud-based storage system, wherein mapping of the user of the third-party service to the user account of the cloud-based storage system is performed in response to determining the user information for the user of the third-party service matches user information in the set of user information of the cloud-based storage system.

4. The method of claim 3, wherein generating the mapping of the user of the third-party service to the user account of the cloud-based storage system further comprises determining, by the domain-wide authorization system, whether the user of the third-party service is eligible for domain-wide authentication and authorization, wherein mapping of the user of the third-party service to the user account of the cloud-based storage system is performed in response to determining the user of the third-party service is eligible for domain-wide authentication and authorization.

5. The method of claim 3, wherein generating the mapping of the user of the third-party service to the user account of the cloud-based storage system further comprises determining, by the domain-wide authorization system, whether the user of the third-party service has opted out of domain-wide authentication and authorization, wherein mapping of the user of the third-party service to the user account of the cloud-based storage system is performed in response to determining the user of the third-party service has not opted out of domain-wide authentication and authorization.

6. The method of claim 1, wherein generating the one or more tokens for the user of the third-party service based on the mapping of the user of the third-party service to the user account of the cloud-based storage system comprises:

receiving, by the domain-wide authorization system, from the cloud-based storage system, information indicating a scope for authorization of the user of the third-party system;

obtaining, by the domain-wide authorization system, the one or more tokens for the user of the third-party service based on the information indicating the scope for authorization of the user of the third-party system;

providing, by the domain-wide authorization system, the one or more tokens for the user of the third-party service to the third-party service; and notifying, by the domain-wide authorization system, the user of the third-party service of authorization completion.

7. The method of claim 1, wherein the backfill process comprises:

adding, by the domain-wide authorization system, an initiation message for the backfill process to a backfill queue, the initiation message identifying an entity for which the backfill process is performed, wherein the user and the set of users are associated with the entity;

reading, by the domain-wide authorization system, the initiation message for the backfill process from the backfill queue;

retrieving, by the domain-wide authorization system, user information for the set of users based on the entity identified in the initiation message;

assigning, by the domain-wide authorization system, the set of users to a group of users for the backfill process;

creating, by the domain-wide authorization system, a fanout job for the group of users;

adding, by the domain-wide authorization system, the fanout job to a job queue;

reading, by the domain-wide authorization system, the fanout job from the job queue;

mapping, by the domain-wide authorization system, the set of users of the third-party service to a set of users account of the cloud-based storage system;

generating, by the domain-wide authorization system, one or more tokens for the set of users of the third-party service based on the mapping of the set of users of the third-party service to the set of users account of the cloud-based storage system;

providing, by the domain-wide authorization system, the one or more tokens for the set of users of the third-party service to the third-party service; and notifying, by the domain-wide authorization system, the set of users of the third-party service of authorization completion.

8. A system comprising:

a processor; and a memory coupled with and readable by the processor and storing therein a set of instructions which, when executed by the processor, causes the processor to perform domain-wide authentication and authorization in a cloud-based environment by:

initiating a backfill process performing domain-wide authentication and authorization for a plurality of users of a third-party service of the cloud-based environment, wherein the backfill process comprises onboarding of the plurality of users of the third-party service as users of the cloud-based environment;

receiving, from the third-party service of the cloud-based environment, a request to perform authentication and authorization of a user of the of the plurality of users of the third-party service for accessing a cloud-based storage system of the cloud-based environment through the third-party service, wherein the user of the third party service is logged into the third-party service but not the cloud-based storage system;

generating a mapping of the user of the third-party service to a user account of the user of the third-party service on the cloud-based storage system;

generating one or more tokens for the user of the third-party service based on the mapping of the user of the third-party service to the user account of the cloud-based storage system, wherein the one or more tokens provide access to services of the cloud-based storage system; and providing the one or more tokens to the third-party service.

9. The system of claim 8, wherein generating the mapping of the user of the third-party service to the user account of the cloud-based storage system comprises:

receiving, from the third-party service, user information for the user of the third-party service;

searching a set of user information of the cloud-based storage system based on the received user information for the user of the third-party service; and determining whether the user information for the user of the third-party service matches any user information in the set of user information of the cloud-based storage system, wherein mapping of the user of the third-party service to the user account of the cloud-based storage system is performed in response to determining the user information for the user of the third-party service matches user information in the set of user information of the cloud-based storage system.

10. The system of claim 9, wherein generating the mapping of the user of the third-party service to the user account of the cloud-based storage system further comprises determining whether the user of the third-party service is eligible for domain-wide authentication and authorization, wherein mapping of the user of the third-party service to the user account of the cloud-based storage system is performed in response to determining the user of the third-party service is eligible for domain-wide authentication and authorization.

11. The system of claim 9, wherein generating the mapping of the user of the third-party service to the user account of the cloud-based storage system further comprises determining whether the user of the third-party service has opted out of domain-wide authentication and authorization, wherein mapping of the user of the third-party service to the user account of the cloud-based storage system is performed in response to determining the user of the third-party service has not opted out of domain-wide authentication and authorization.

12. The system of claim 8, wherein generating the one or more tokens for the user of the third-party service based on the mapping of the user of the third-party service to the user account of the cloud-based storage system comprises:

receiving, from the cloud-based storage system, information indicating a scope for authorization of the user of the third-party system;

obtaining the one or more tokens for the user of the third-party service based on the information indicating the scope for authorization of the user of the third-party system;

providing the one or more tokens for the user of the third-party service to the third-party service; and notifying the user of the third-party service of authorization completion.

13. The system of claim 8, wherein the backfill process comprises:

adding an initiation message for the backfill process to a backfill queue, the initiation message identifying an entity for which the backfill process is performed, wherein the user and the set of users are associated with the entity;

reading the initiation message for the backfill process from the backfill queue;

retrieving user information for the set of users based on the entity identified in the initiation message;

assigning the set of users to a group of users for the backfill process;

creating a fanout job for the group of users;

adding the fanout job to a job queue;

reading the fanout job from the job queue;

mapping the set of users of the third-party service to a set of users account of the cloud-based storage system;

generating one or more tokens for the set of users of the third-party service based on the mapping of the set of users of the third-party service to the set of users account of the cloud-based storage system;

providing the one or more tokens for the set of users of the third-party service to the third-party service; and notifying the set of users of the third-party service of authorization completion.

14. A non-transitory, computer-readable medium comprising a set of instructions stored therein which, when executed by a processor, causes the processor to perform domain-wide authentication and authorization in a cloud-based environment by:

initiating a backfill process performing domain-wide authentication and authorization for a plurality of users of a third-party service of the cloud-based environment, wherein the backfill process comprises onboarding of the plurality of users of the third-party service as users of the cloud-based environment;

receiving, from the third-party service of the cloud-based environment, a request to perform authentication and authorization of a user of the of the plurality of the third-party service for accessing a cloud-based storage system of the cloud-based environment through the third-party service, wherein the user of the third party service is logged into the third-party service but not the cloud-based storage system;

generating a mapping of the user of the third-party service to a user account of the user of the third-party service on the cloud-based storage system;

generating one or more tokens for the user of the third-party service based on the mapping of the user of the third-party service to the user account of the cloud-based storage system, wherein the one or more tokens provide access to services of the cloud-based storage system; and providing the one or more tokens to the third-party service.

15. The non-transitory, computer-readable medium of claim 14, wherein generating the mapping of the user of the third-party service to the user account of the cloud-based storage system comprises:

> receiving, from the third-party service, user information for the user of the third-party service;
> searching a set of user information of the cloud-based storage system based on the received user information for the user of the third-party service; and
> determining whether the user information for the user of the third-party service matches any user information in the set of user information of the cloud-based storage system, wherein mapping of the user of the third-party service to the user account of the cloud-based storage system is performed in response to determining the user information for the user of the third-party service matches user information in the set of user information of the cloud-based storage system.

16. The non-transitory, computer-readable medium of claim 15, wherein generating the mapping of the user of the third-party service to the user account of the cloud-based storage system further comprises determining whether the user of the third-party service is eligible for domain-wide authentication and authorization, wherein mapping of the user of the third-party service to the user account of the cloud-based storage system is performed in response to determining the user of the third-party service is eligible for domain-wide authentication and authorization.

17. The non-transitory, computer-readable medium of claim 15, wherein generating the mapping of the user of the third-party service to the user account of the cloud-based storage system further comprises determining whether the user of the third-party service has opted out of domain-wide authentication and authorization, wherein mapping of the user of the third-party service to the user account of the cloud-based storage system is performed in response to determining the user of the third-party service has not opted out of domain-wide authentication and authorization.

18. The non-transitory, computer-readable medium of claim 14, wherein generating the one or more tokens for the user of the third-party service based on the mapping of the user of the third-party service to the user account of the cloud-based storage system comprises:

> receiving, from the cloud-based storage system, information indicating a scope for authorization of the user of the third-party system;
> obtaining the one or more tokens for the user of the third-party service based on the information indicating the scope for authorization of the user of the third-party system;
> providing the one or more tokens for the user of the third-party service to the third-party service; and
> notifying the user of the third-party service of authorization completion.

19. The non-transitory, computer-readable medium of claim 14, wherein the backfill process comprises:

> adding an initiation message for the backfill process to a backfill queue, the initiation message identifying an entity for which the backfill process is performed, wherein the user and the set of users are associated with the entity;
> reading the initiation message for the backfill process from the backfill queue;
> retrieving user information for the set of users based on the entity identified in the initiation message;
> assigning the set of users to a group of users for the backfill process;
> creating a fanout job for the group of users;
> adding the fanout job to a job queue;
> reading the fanout job from the job queue;
> mapping the set of users of the third-party service to a set of users account of the cloud-based storage system;
> generating one or more tokens for the set of users of the third-party service based on the mapping of the set of users of the third-party service to the set of users account of the cloud-based storage system;
> providing the one or more tokens for the set of users of the third-party service to the third-party service; and
> notifying the set of users of the third-party service of authorization completion.

\* \* \* \* \*